US010715541B2

(12) United States Patent
Griggs

(10) Patent No.: US 10,715,541 B2
(45) Date of Patent: Jul. 14, 2020

(54) SYSTEMS AND METHODS FOR SECURITY MONITORING PROCESSING

(71) Applicant: cmdSecurity Inc., Winter Springs, FL (US)

(72) Inventor: Daniel Griggs, Arlington, VA (US)

(73) Assignee: cmdSecurity Inc., Winter Springs, FL (US)

(*) Notice: Subject to any disclaimer, the term of this patent is extended or adjusted under 35 U.S.C. 154(b) by 0 days.

(21) Appl. No.: 16/673,330

(22) Filed: Nov. 4, 2019

(65) Prior Publication Data

US 2020/0145439 A1 May 7, 2020

Related U.S. Application Data

(60) Provisional application No. 62/755,875, filed on Nov. 5, 2018.

(51) Int. Cl.
| | | |
|---|---|---|
| *H04L 29/06* | (2006.01) |
| *G06F 16/25* | (2019.01) |
| *G06F 21/55* | (2013.01) |
| *H04L 12/24* | (2006.01) |

(52) U.S. Cl.
CPC ........ *H04L 63/1425* (2013.01); *G06F 16/258* (2019.01); *G06F 21/552* (2013.01); *G06F 21/554* (2013.01); *H04L 41/0604* (2013.01); *H04L 63/101* (2013.01); *H04L 63/1416* (2013.01)

(58) Field of Classification Search
CPC . G06F 21/552; G06F 21/554; H04L 63/1416; H04L 63/1425; H04L 41/0604
See application file for complete search history.

(56) References Cited

U.S. PATENT DOCUMENTS

| | | | |
|---|---|---|---|
| 6,347,374 B1 | 2/2002 | Drake et al. |
| 6,738,801 B1 | 5/2004 | Kawaguchi et al. |
| 7,111,075 B2 | 9/2006 | Pankovcin et al. |
| 7,577,963 B2 | 8/2009 | O'Farrell et al. |
| 7,640,245 B1 * | 12/2009 | Abdo ................. G06F 9/44505 |
| 8,020,052 B2 | 9/2011 | Huang et al. |
| 8,060,470 B2 | 11/2011 | Davidson et al. |
| 8,312,515 B2 | 11/2012 | Ratnala et al. |
| 8,490,171 B2 | 7/2013 | Harrison et al. |
| 8,533,022 B2 | 9/2013 | Krishnan Nair |
| 8,589,348 B2 | 11/2013 | Tobin et al. |

(Continued)

FOREIGN PATENT DOCUMENTS

| | | |
|---|---|---|
| CN | 102750283 A1 | 10/2012 |
| CN | 103823743 A | 5/2014 |
| WO | 2012135192 A2 | 10/2012 |

*Primary Examiner* — Thaddeus J Plecha
(74) *Attorney, Agent, or Firm* — Bookoff McAndrews, PLLC

(57) ABSTRACT

A computer-implemented method may be used for security event monitoring. The method may include receiving data from a first operating system and defining an audit classes data filter for collection by a security event monitoring application. Additionally, the method may include comparing the data with the audit classes data filter and comparing the data with a set of blacklisted values. Additionally, the method may include outputting a common structure format data based on the comparison of the processing data with the audit classes data filter and the blacklisted values.

16 Claims, 10 Drawing Sheets

(56) References Cited

U.S. PATENT DOCUMENTS

| | | | |
|---|---|---|---|
| 9,191,266 B2 | 11/2015 | Abraham et al. | |
| 9,218,068 B2 | 12/2015 | Zhang et al. | |
| 9,330,198 B1* | 5/2016 | Campbell | H04L 67/02 |
| 9,367,813 B2 | 6/2016 | Jung et al. | |
| 9,369,478 B2 | 6/2016 | Kumar et al. | |
| 9,633,025 B2 | 4/2017 | Gokhale et al. | |
| 9,654,485 B1* | 5/2017 | Neumann | H04L 63/1416 |
| 10,025,500 B2 | 7/2018 | Caine et al. | |
| 2007/0005535 A1* | 1/2007 | Salahshour | G06F 9/542 |
| | | | 706/20 |
| 2008/0184058 A1* | 7/2008 | McDermott | G06Q 20/40 |
| | | | 714/2 |
| 2009/0085897 A1 | 4/2009 | Hirakawa et al. | |
| 2015/0161277 A1* | 6/2015 | Heller | G06F 9/44526 |
| | | | 715/229 |
| 2015/0254740 A1 | 9/2015 | Akolkar et al. | |
| 2015/0254778 A1 | 9/2015 | Kmak et al. | |
| 2016/0065884 A1* | 3/2016 | Di Censo | H04N 5/765 |
| | | | 386/227 |
| 2016/0253229 A1 | 9/2016 | Sade et al. | |
| 2016/0378577 A1* | 12/2016 | Russell | G06F 11/3086 |
| | | | 719/318 |
| 2017/0264511 A1 | 9/2017 | Myadam | |
| 2018/0027006 A1 | 1/2018 | Zimmermann et al. | |
| 2018/0060314 A1 | 3/2018 | Xu et al. | |
| 2018/0075193 A1 | 3/2018 | Angell et al. | |
| 2018/0285008 A1 | 10/2018 | Challagolla et al. | |
| 2020/0026858 A1* | 1/2020 | Subramanian | G06F 21/57 |

* cited by examiner

SYSTEMS AND METHODS FOR SECURITY MONITORING PROCESSING

TECHNICAL FIELD

Various embodiments of the present disclosure relate generally to monitoring processes performed in an operating system, and more specifically to performing security related actions in an operating system environment.

BACKGROUND

Network attacks and cyber security is of major importance to security-minded enterprises. Businesses and regulated environments of all markets are requiring authoritative auditing and logging measures of all computing machines connected to their networks. Traditional security solutions may provide enterprises with preventative endpoint protection, where the software reacts to new files entering computing devices, and if deemed malicious automatically stops them from running on the devices. However, attackers are still able to penetrate the computing devices without triggering these defenses.

Current operating systems may include built-in tools for collections and monitoring of processes executed on the computing devices. For example, Apple™ ships the latest version of OpenBSM pre-installed on all macOS™ running computers. OpenBSM is an open source implementation of Sun Microsystems' Basic Security Module (BSM) audit API and file format. OpenBSM collects login and authentication events only in a default configuration, and the events are not stored in a human-readable format.

However, existing security software tools ignore systems such as OpenBSM already built into the operating system and create their own collections and monitoring methods, and in many instances, introduce security issues into the operating system. Thus, enterprises using existing security software may be unwittingly compromising their computing machines. Furthermore, log collection tools cannot ingest logs generated by OpenBSM without some application or script transforming the OpenBSM logs on a set interval. The native OpenBSM log format is not designed for real-time auditing and collection.

Still further, collecting all events that OpenBSM generates will significantly slow down existing computer systems to a point where it is unusable. For example, by observing the stream of all events, additional events will be generated detailing the observation and an infinite loop will be created. Event generation scales with the speed of computer, so this issue will not necessarily be cured over time.

Other existing tools include proof of concept code that can only be run on developer machines under special conditions. These tools are not complete, do not scale, and are not designed to be managed remotely. Furthermore, such tools do not use OpenBSM. OpenBSM may be important, in some aspects, because it uses the Unix™ standard. Open-BSM may be the only way for non-kernel programs to collect security and auditing information. Other collection methods require a vendor to install kernel-level code which introduces instability and new security concerns. In some cases, only specific Kernel extensions may run in the first operating systems and Kernel extensions related to other operating systems may be disallowed by the first operating system.

Other tools ignore systems native to macOS in favor of their own code for monitoring, collection, and blocking of security events. Non-native toolsets require integration testing for each and every sub build of macOS. This vendor code leads to instability and performance issues of the entire system as the vendor's code must approve all actions taken by the system before an action is executed. These conventional systems require vendor kernel extension (kexts). Kexts introduce the possibility of severe security vulnerabilities. Kexts run at the lowest level of the operating system, and any bug or error will crash the system completely. On macOS 10.13.3+, kexts need to be white-listed or approved by the user.

Often macOS system updates need to be delayed at a company so that vendors can update their tools. Updating macOS without updating the vendor's tool will often lead to unusable systems requiring expert assistance from IT. Exact versions required for exact versions of macOS is nearly unsustainable. These tools upload data (including entire files) to vendor cloud for processing and threat analysis. Some tools send data directly to a vendor-hosted cloud server that performs log analysis. No human-readable logs are left on the device or in the cloud. Even if done correctly, many organizations do not want company data on any non-company systems. Windows OS is the dominant operating system in most companies, and most tools are developed for windows first, and then macOS second.

Kernel extensions may be the code that runs at the very highest permission on macOS (e.g., the first operating systems) and may be a required link in the execution chain for relevant operations. Any error in that code may cause catastrophic errors. A kernel extension that works with application executions may be a required step for every single app execution whether or not that kernel module is doing anything with that specific application.

Other challenges for existing solutions include a low level of documentation for macOS and limited (or sometimes incorrect for macOS) documentation from Oracle's Sun operating system. Security application vendors may have been focused more on blocking potential threats rather than just reporting on them.

There are extremely few security applications developed solely for macOS. Typically, macOS is a secondary platform and not the primary development focus, resulting in crashing systems.

The present disclosure is directed to addressing one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, non-transitory computer readable media, systems, and methods are disclosed for security event monitoring. Each of the examples disclosed herein may include one or more of the features described in connection with any of the other disclosed examples.

In one example, a computer implemented method may be used for security event monitoring. The method may include receiving, by one or more processors, data from a security module of a first operating system; defining, by the one or more processors, an audit classes data filter for collection by a security event monitoring application; receiving, by the one or more processors, a verbosity level of the audit classes data filter, wherein the verbosity level defines the amount of audit classes data collected; filtering, by the one or more processors, the data based on the verbosity level of the audit classes data filter; comparing, by the one or more processors, the data with the audit classes data filter; dropping, by the one or more processors, the data upon determining that the data does not match the audit classes data based on the comparison of the data with the audit classes data filter; comparing, by the one or more processors, the data with a set of blacklisted values; dropping, by the one or more processors, the data upon determining that the data matches one or more blacklisted values from the set of blacklisted values, based on the comparison of the data with the set of blacklisted values; capturing, by the one or more processors, audit event data, wherein audit event data is a portion of the audit classes data and is related to actions performed by the first computing device; determining, by the one or more processors, at least one token based on a token identifier, wherein the at least one token is related to an attribute of an audit event; parsing, by the processor, the at least one token into a common structured format; and outputting, by the one or more processors, the common structure format data based on the comparison of the data with the audit classes data filter and the blacklisted values.

According to another aspect of the disclosure, a non-transitory computer-readable medium for security event monitoring storing instructions that, when executed by one or more processors, configure the at least one processor to perform receiving, by the one or more processors, data from a first operating system; defining, by the one or more processors, an audit classes data filter for collection by a security event monitoring application; comparing, by the one or more processors, the data with the audit classes data filter; comparing, by the one or more processors, the data with a set of blacklisted values; and outputting, by the one or more processors, a common structure format data based on the comparison of the processing data with the audit classes data filter and the blacklisted values.

According to still another aspect of the disclosure, a computer-implemented method may be used for security event monitoring. The method may include receiving, by the one or more processors, data a first operating system; comparing, by the one or more processors, at least one of (1) the data with an audit classes data filter and/or (2) the data with a set of blacklisted values; and outputting, by the one or more processors, a common structure format data based on the comparison of the processing data with the audit classes data filter and/or the blacklisted values.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Figure 1:
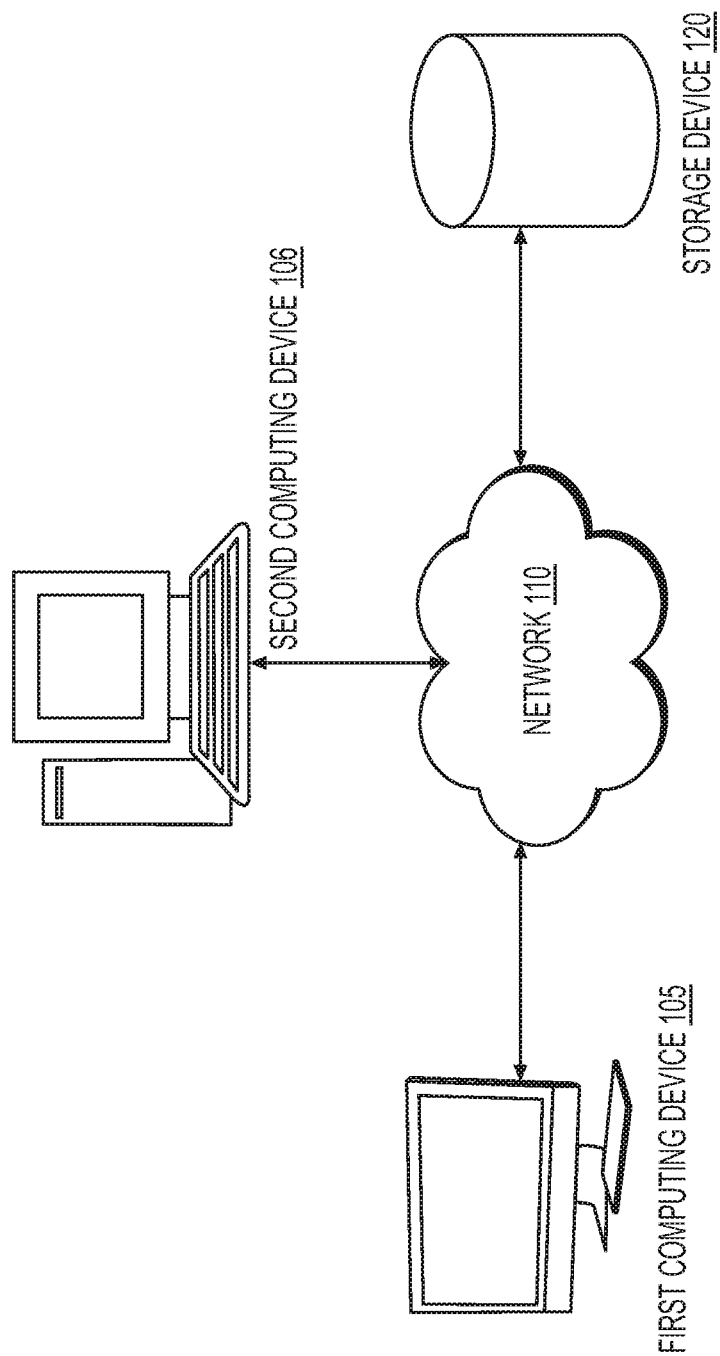
FIG. 1 depicts an exemplary environment in which systems, methods and other aspects of the present disclosure may be implemented.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

As described above, software security solutions may not offer sufficient protection and may introduce further instabilities in computing devices. Therefore, a need exist for the disclosed systems, such as, e.g., an automated, intelligent programmable system that is configured to detect executable actions or activities on an computing system, provide an alert that an executable action or activity is triggered on the system, validate the executable action or activity, process such executable action or activity if valid, and if not valid, create a response that allows such action or activity to proceed with an accompanying alert, or terminate or reduce the action or activity, and/or monitoring and recording such activity or action.

Embodiments of the present disclosure relate to systems or methods which may perform one or more roles of a security motion detector. For example, the presently disclosed systems and methods may detect anything running (e.g., software) on, or authenticating (e.g., software or actual people) into, a computer running a first operating system, such as, e.g., macOS™. The system may then take that detected data, format it so that fields are named in the same or sufficiently similar manner as events of the same type in a second operating system (e.g., Windows™), and write to a log file that may be specially formatted in such a way that log collection tools may easily collect it. As used herein, a first operating system may be, for example, a particular operating system among the macOS™ series or any operating system from Apple™ and a second operating system may be any operating system among the Microsoft™ OS products (e.g., Windows™).

The present disclosure describes a system and method designed for real-time streaming of curated security event data and generating a data object in common data structures that may be analyzed by a plurality of different tools. For example, streaming data of audit content of dynamic or previously unknown length are received, and the content is parsed into a structure data format, including labeling pieces of content with a structured format to aid in analysis. Furthermore, the present disclosure may be designed to have low impact on a computer's resources (e.g., CPU, memory, etc.) and user experience.

In addition, the present disclosure describes an endpoint detection and response (EDR) tool that may have functions such as monitoring file system modification and creation; collecting event data related to process, authentication, and significant system modification; translating the collected and detected data fields to a field scheme of a second operation system (e.g., Windows™); enriching formatted results streams with cross-referenced information from detected data; device quarantine functions by shutting down all data connections except for predefined device management servers, in response to pre-defined actions or events (e.g., in response to an Apple™ configuration profile being delivered to a device); and/or outputting formatted results data (e.g., JSON, csv, xml), in its entirety directly to a server defined in one or more preferences.

OpenBSM APIs may be difficult to use, and do not provide the flexibility required to collect the correct audit_event types as the default filter classes are extremely broad and contain a lot of extraneous data. A system or method in accordance with the present disclosure may overcome these API challenges, and implement multiple levels of audit_event filters to collect only relevant data. A printing engine of the present disclosure may be customized, and may output the collected event data into JSON and other structured data formats which may be easily human or machine readable.

A system in accordance with the present disclosure may stream only relevant audit_events from OpenBSM, and may format them for easy collection by existing enterprise security tools. Some implementations may declare particular classes of audit_events for collection. Then, in some implementations, a system may further filter the audit_events from those classes to only collect the data that is relevant and necessary. These filtered audit_events may then be compared against blacklist filter that may drop audit_events with specific words or phrases in them. Audit_events that pass the tests of both filters may then output to either a local computer file system or be transferred over the network to a log collection server.

Referring now to the appended drawings, FIG. 1 shows an exemplary environment 100 in which systems, methods and other aspects of the present disclosure may be implemented. Environment 100 may include at least one (i.e., one or more) first computing device 105, at least one (i.e., one or more) second computing device 106, network 110, and at least one (i.e., one or more) storage device 120. The at least one first computing device 105 and at least one second computing device 106 are connected to the network 110. Network 110 may be any suitable network or combination of networks and may support any appropriate protocol suitable for communication of data between various components in the system environment 100. The network 110 may include a public network (e.g., the internet), a private network (e.g., a network within an organization), or a combination of public and/or private networks. The at least one storage device 120 may be a local hard drive, a network server, or any other customer-defined destination repository.

The at least one first computing device 105 and at least one second computing device 106 may be operated by one or more users. Examples of first computing device 105 and second computing device 106 may include smartphones, wearable computing devices, tablet computers, laptops, and desktop computers. The first computing device 105 may have various software and a particular operating system (a first operating system) installed on the computing device. For example, the first operating system may be macOS™ or any operating system from Apple™. The second computing device 106 may have various software and a particular second operating system installed on the computing device. For example, the second operating system may be a different operating system than the first operating system, such as, e.g., Windows™ or any operating system from Microsoft™, or any open source operating system.

Environment 100 may include one or more first and second computer devices configured to gather, process, transmit, and/or receive data. In general, whenever environment 100 is described as performing an operation of gathering, processing, transmitting, or receiving data, it is understood that such operation may be performed by a computer system thereof. In general, a computer system may include one or more computing devices, as described in connection with FIG. 7 below.

Figure 2:
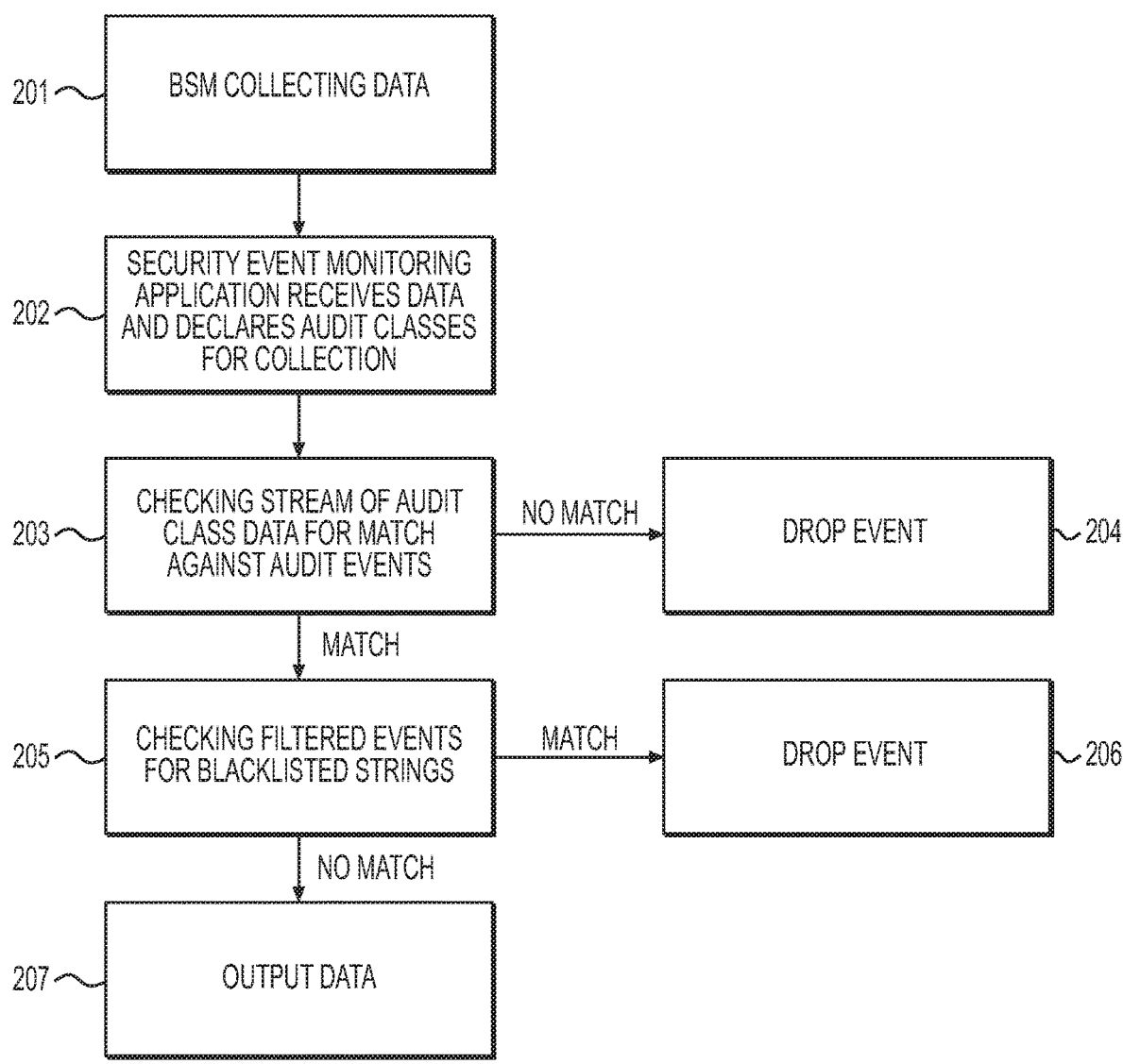
FIG. 2 depicts an exemplary flow diagram of security event monitoring, according to one aspect of the present disclosure.

FIG. 2. shows an exemplary flow method 200 of security event monitoring, according to one aspect of the present disclosure. Method 200 may begin with step 201 with collecting data by a basic security module (BSM). A BSM may be a software module that creates detailed audit trail for all processes on the first computing device 105. A BSM may describe a set of system call and library interfaces for managing audit records as well as token stream file format that permits extensible and generalized audit trail processing. The data collected by the BSM may be related to execution processes (e.g., execution of software), authentication processes (e.g., authentication of software or authentication of users), connection processes (e.g., networking connection, hardware connection, or cable connection), and/or other processes on the first computing device 105. The BSM may be installed on the first computing device 105, and in one embodiment may be OpenBSM. After collection by the BSM, the collected data may be streamed to a security event monitoring application at step 202, and the security event monitoring application may declare audit classes for collection. Audit classes may be audit events grouped into logical categories. Examples of audit classes may be actions performed by the CPU of the first computing device 105 related to file creation, network, and process.

At step 203, the security event monitoring application may parse through the stream of audit class data for predetermined audit events. Audit events may be actions generated by the BSM in response to an action performed by the CPU for a computer running a first operating system. Audit events may be actions related to security operations and/or application executions. Each auditable event is defined in the file by a symbolic name, an event number, a set of preselection classes, and a short description. If an audit event is found to match the predetermined audit events, then the audit event may be dropped from the stream of collected data at step 204, thereby creating a filtered stream of audit events. The filtered stream of audit events may then be checked or otherwise analyzed for blacklisted strings at step 205. At this step, the filtered stream of audit events may be compared against one or more blacklist filters. If any audit events match the one or more blacklist filters, then the matching audit events may be dropped from the stream of audit events at step 206. At step 207, the stream of audit events matching predetermined audit events and not matching the one or more blacklist filters may be outputted to a local computer file system or be transferred over the network to a log collection server. The local computer file system or the log collection server may correspond to at the least one storage device 120.

Figure 3:
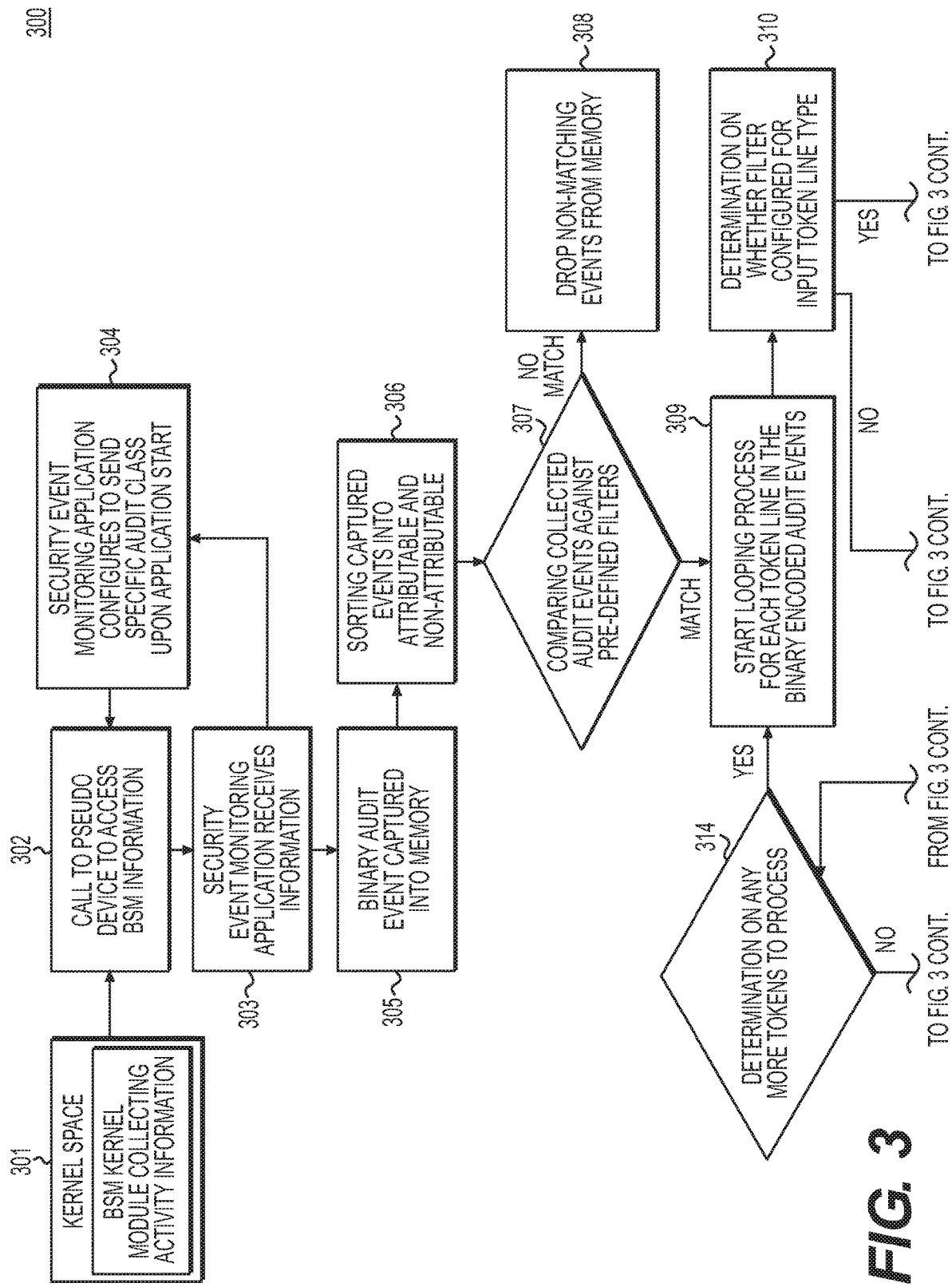
FIG. 3 depicts an exemplary flow diagram of security event monitoring with filters, according to one aspect of the present disclosure.
Figure 3:
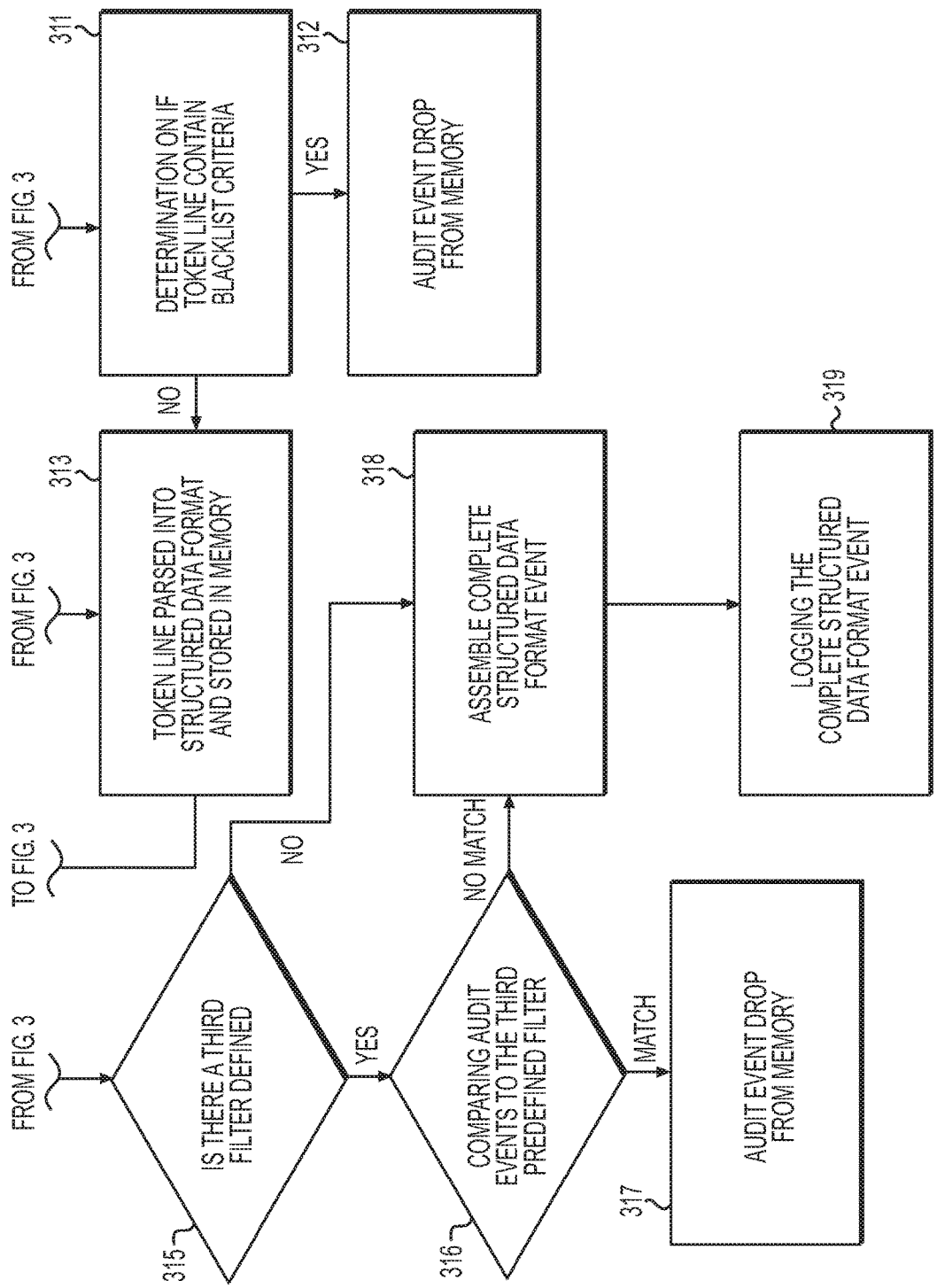

FIG. 3 depicts an exemplary method 300 of security event monitoring with filters, according to one aspect of the present disclosure. Method 300 may be performed on the first computing device 105 and may begin at step 301 where a BSM kernel module residing in the kernel space of the first operating system of the first computing device 105 may log activities and information relating to activities performed by the first computing device 105 and the manner in which first computing device 105 is performing. The log of activities and information may include one or more streams of data describing the operations, failures, and changes that occur on or via the first operating system 105. The collection of activities and information may be accessed at step 302 via a call to a pseudo device such as auditpipe. A security event monitoring application may call the pseudo device at step 303 to receive the data stream of the collection of activities and information. The security event monitoring application may be a daemon process, which may be a process that runs invisibly in the background on the first operating system outside of kernel space. The daemon process may run with system (e.g., root) permissions or on behalf of a specific user. Upon the startup of the security event monitoring application, a configuration of specific audit classes to be monitored and collected from the pseudo device may be defined at step 304.

At step 305, binary encoded audit events may be captured by the security event monitoring application and stored into memory (e.g., storage device 120). At step 306, a sorting process may be completed to sort the captured audit events into attributable events and non-attributable events. A comparison may be made in step 307 between the collected audit events and audit event types in pre-defined filters, and if the collected audit events do not match an audit event type in the pre-defined filters, then the collected audit events may be dropped from the memory (e.g., storage device 120) at step 308. If the collected audit events match the audit event type in the pre-defined filters, then a looping process may start at step 309 for each token line in the binary encoded audit events. A token may be a set of audit data and may be stored in binary form. Each token may describe/represent an attribute of an audit event, such as a process, a path, or other objects. Each token may have a token type identifier followed by data that is specific to the token. At step 310, a determination may be made to determine if there are filters configured for input token line type. If filters are configured for input token type, then at step 311, the token line may be examined to determine if the token line contain blacklist criteria. If it is determined that the token line contain blacklist criteria then at step 312 the audit event to which the token belongs to may be dropped from memory. If the determination in step 310 or step 311 is negative (e.g., no filter configured for input token line type, or token line does not contain blacklist criteria) then the token line may be parsed into a structured data format recognizable by the second operating system (e.g., JSON text event format, or csv, xml, etc.) and stored in memory (e.g., storage device 120) at step 313.

At step 314, a determination is made whether there are any additional tokens in the audit event to process. If there are no additional tokens in the audit event to process, then at step 315, a determination is made whether a third filter has been defined. If a third filter has been defined, then at step 316, the collected audit events may be compared to the third predefined filter. If an audit event matches the third predefined filter, then the audit event may be dropped from memory at step 317. If a third filter is not defined, or there is no matching audit event with the third predefined filter, then at step 318, a complete structured data format event may be assembled and at step 319, and the complete structured data format event may be logged and stored in the storage device 120. The complete structured data format event may include multiple structured data formats (e.g., JSON stanzas) that may be combined to create a structured data object (e.g., JSON object).

Figure 4:
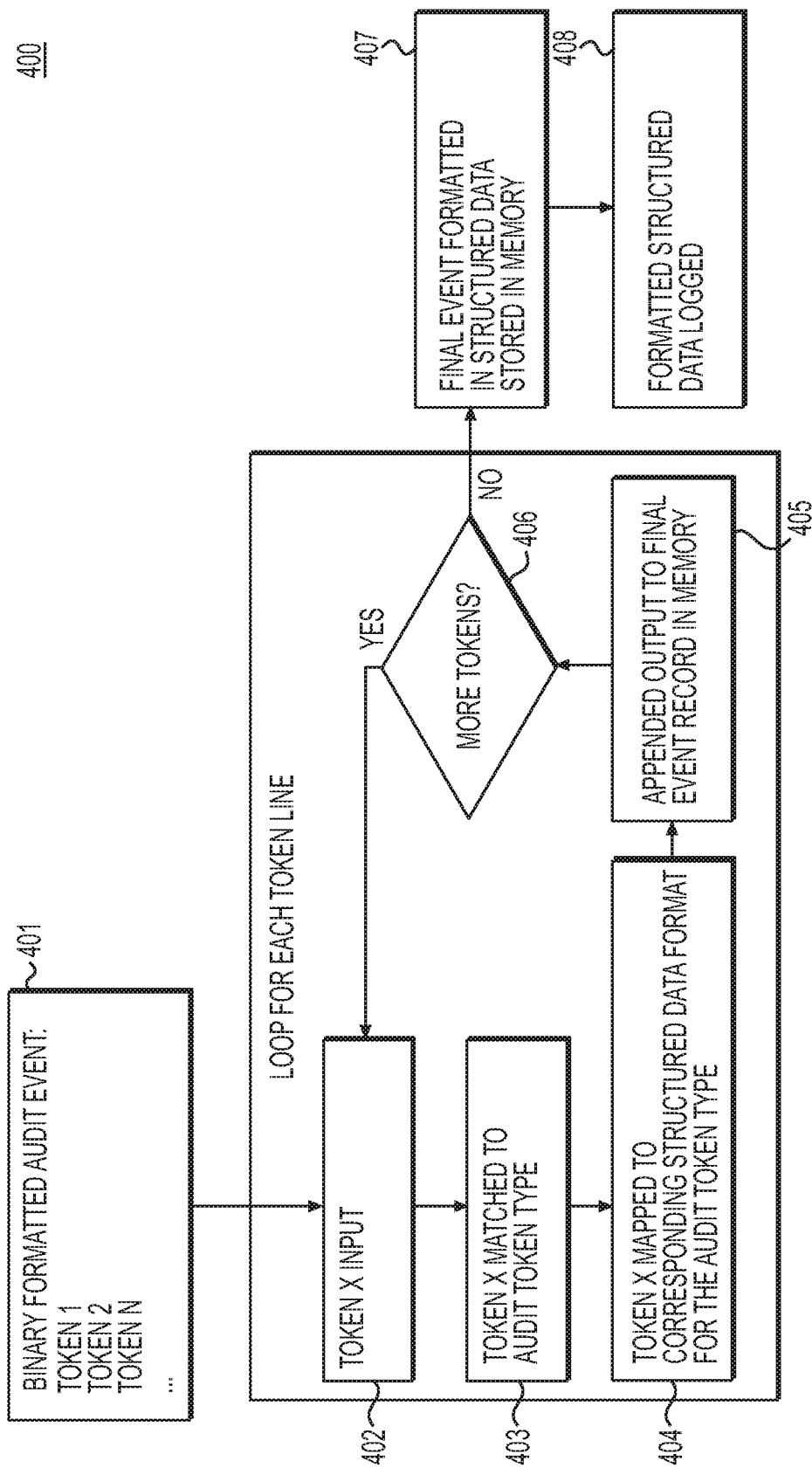
FIG. 4 depicts an exemplary flow diagram of event token processing, according to one aspect of the present disclosure.

FIG. 4 depicts an exemplary method 400 of event token processing, according to one aspect of the present disclosure. Method 400 may be performed on the first computing device 105 and may begin at step 401 with a collection of binary formatted audit events streamed to the security event monitoring application residing on the first computing device 105. Each binary formatted audit event may include at least one token (e.g., token 1-token N). At step 402, each token within an audit event may be retrieved and received by a parsing engine of the security event monitoring application for mapping processing. At step 403, the token may be matched to an audit token type and at step 404, the token may be mapped to a corresponding structured data format for the audit token type. In one embodiment, JSON may be used for the structured data format and event lines may be mapped into the corresponding JSON stanzas. Of course, it is contemplated that other types of structured data formats may be utilized. Examples of header token mapping may be "EVENT_ID_LABEL "event_id"", "EVENT_NAME_LABEL "event_name"", "TIMESEC_LABEL "time_seconds_epoch", "TIMEMS_LABEL "time_milliseconds_offset"", "VERSION_LABEL "version"", "EVENT_MODIFIER "event_modifer"", "NA_OR_A_EVENT_LABEL "is_non_attributeable_event"", "FAILED_EVENT_LABEL "is_failed_audit_event"". Other mapping may also be used and may map the event naming conventions of the first operating system to the naming conventions recognized by the second operating system. Once the mapping process is complete, at step 405, the output may be appended to final event record in memory in the first computing device or the storage device 120. At step 406, a determination may be performed as to whether there are more tokens in the audit event. If the result of the determination is positive, then the method 400 returns to step 402, where more tokens are received and parsed. If all the tokens within an audit event have been parsed and mapped to a corresponding structured data format, then at step 407, a final event formatted in structured data format (e.g., JSON) may be stored in memory in the first computing device or the storage device 120 and the formatted event is logged in the first computing device or the storage device 120 in step 408 and the resulting structured data (e.g., JSON) object may have all the relevant data from the single binary event.

Figure 5:
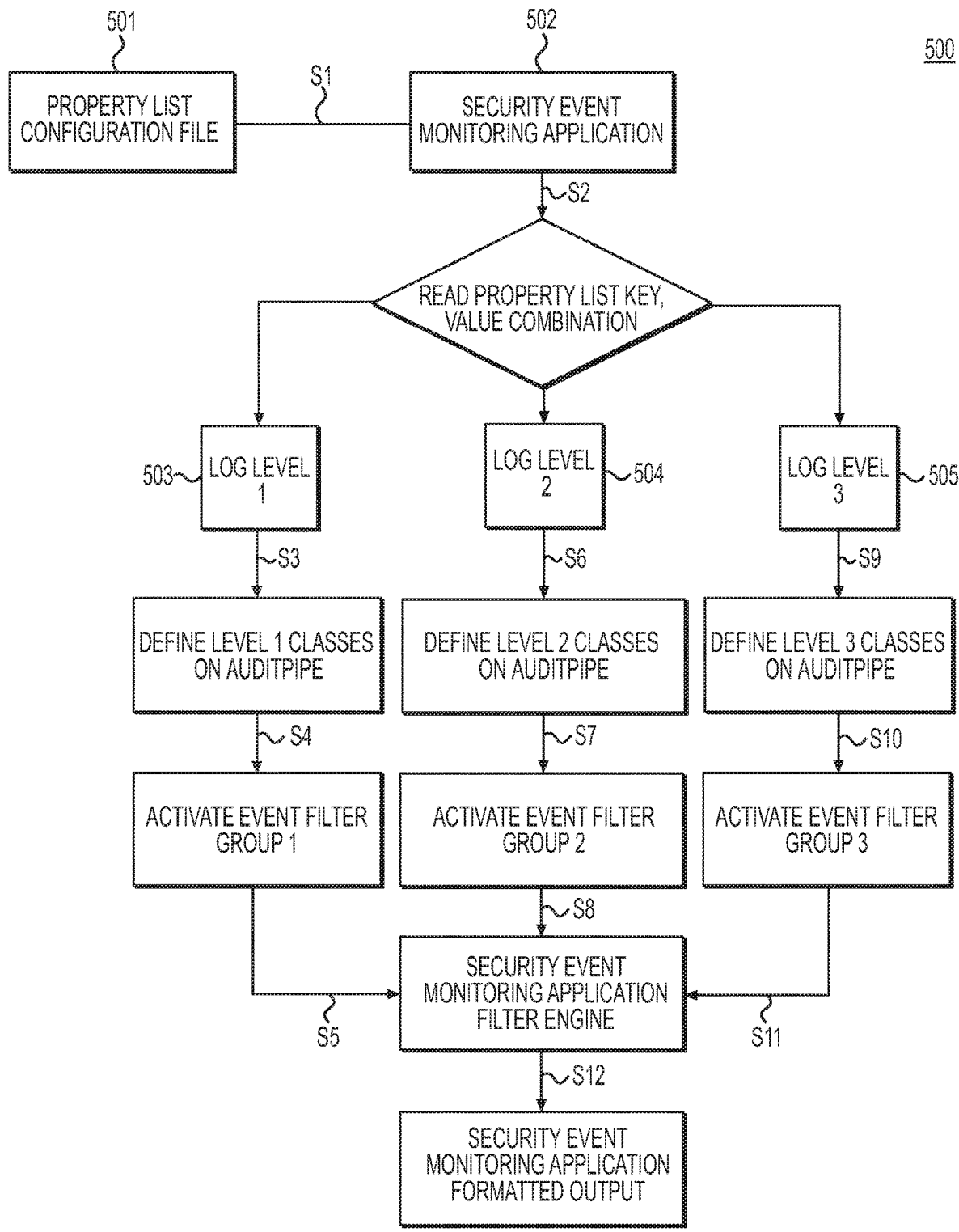
FIG. 5 depicts an exemplary flow diagram of a security event monitoring configuration, according to one aspect of the present disclosure.

FIG. 5 depicts diagram method 500 of a security event monitoring configuration, according to one aspect of the present disclosure. Method 500 may begin with step S1 where a property list configuration file formatted for the first operating systems may be loaded into the security event monitoring application 502 residing on the first computing device 105. The security event monitoring application 502 may read the property list file 501 to determine a property list key and value combination at step S2. The property list file 501 may be used to configure verbosity levels for the sets of collection filters. There may be three verbosity levels that correspond to the relative security risk of the audited system and collect the recommended level of information. In some embodiments, the verbosity levels may correspond to the relative security risk of the audited system as defined, for example, by published risk management framework (e.g., SP 800-37 of National Institute of Standards and Technology). Examples of the three verbosity levels and corresponding collected information may be: "Log level 1" (i.e., a first log level) 503, which may represent the lowest verbosity level (lowest risk or "lowest risk level"), and may collect information related to i) application executions, ii) script and interactive terminal commands, iii) all authentication prompts and outcomes (e.g., logins), and/or iv) all authorization prompts and outcomes (e.g., is user X allowed to perform event Y). "Log level 2" (i.e., a second log level that is different than the first log level) 504, which may represent an intermediate verbosity level (e.g., a higher risk level than the first log level or "intermediate risk level"), and may collect information related to i) all level 1 logging events, ii) application network connection creation, iii) script and interactive terminal network connections, and iv) web browser connection history (e.g., browser logs). "Log level 3," (i.e., a third log level that is different than both the first log level and the second log level) 505, which may represent the highest verbosity level (e.g., a higher risk level than the second log or "highest risk level"), and may collect information related to i) all level 1 and level 2 logging events, ii) inter-process communication events, and iii) additional verbosity to event types collected in lower logging levels. While three levels of verbosity levels are described in this disclosure, more or less verbosity levels are also within the scope of the current disclosure.

In another embodiment, "Log level 1", "Log level 2", "Log level 3" may correspond to different risk levels. In particular, in some embodiments, verbosity does not correlate directly with risk level. For example, "Log level 1" (i.e., a first log level) 503, which may represent the lowest verbosity level may have a risk level of "intermediate risk level" or "highest risk level". "Log level 2" (i.e., a second log level that is different than the first log level) 504, which may represent an intermediate verbosity level may have a risk level of "lowest risk level" or "highest risk level". "Log level 3," (i.e., a third log level that is different than both the first log level and the second log level) 505, which may represent the highest verbosity level may have a risk level of "lowest risk level" or "intermediate risk level".

Once the property list key and value combination is read in step S2, the proper log level may be determined by the security event monitoring application. If log level 1 is desired, then at step S3, the desired data to be collected related to level 1 classes may be defined on the pseudo device auditpipe, and the filters related to the level classes may be implemented in step S4. The collected data may then be transmitted to and parsed by the security event monitoring application filter engine at step S5. If log level 2 is desired, then at step S6, the desired data to be collected related to level 2 classes may be defined on the pseudo device auditpipe, and the filters related to the level classes may be activated in step S7. The collected data may then be transmitted to and parsed by the security event monitoring application filter engine at step S8. If log level 3 is desired, then at step S9, the desired data to be collected related to level 3 classes may be defined on the pseudo device auditpipe, and the filters related to the level classes may be activated in step S10. The collected data may then be transmitted to and parsed by the security event monitoring application filter engine at step S11. Once the collected data from the various log levels have been parsed by the security event monitoring application filter engine, then the security event monitoring application may transform or normalize the data in a format recognizable by the second operating system and output the data at step S12.

Figure 6:
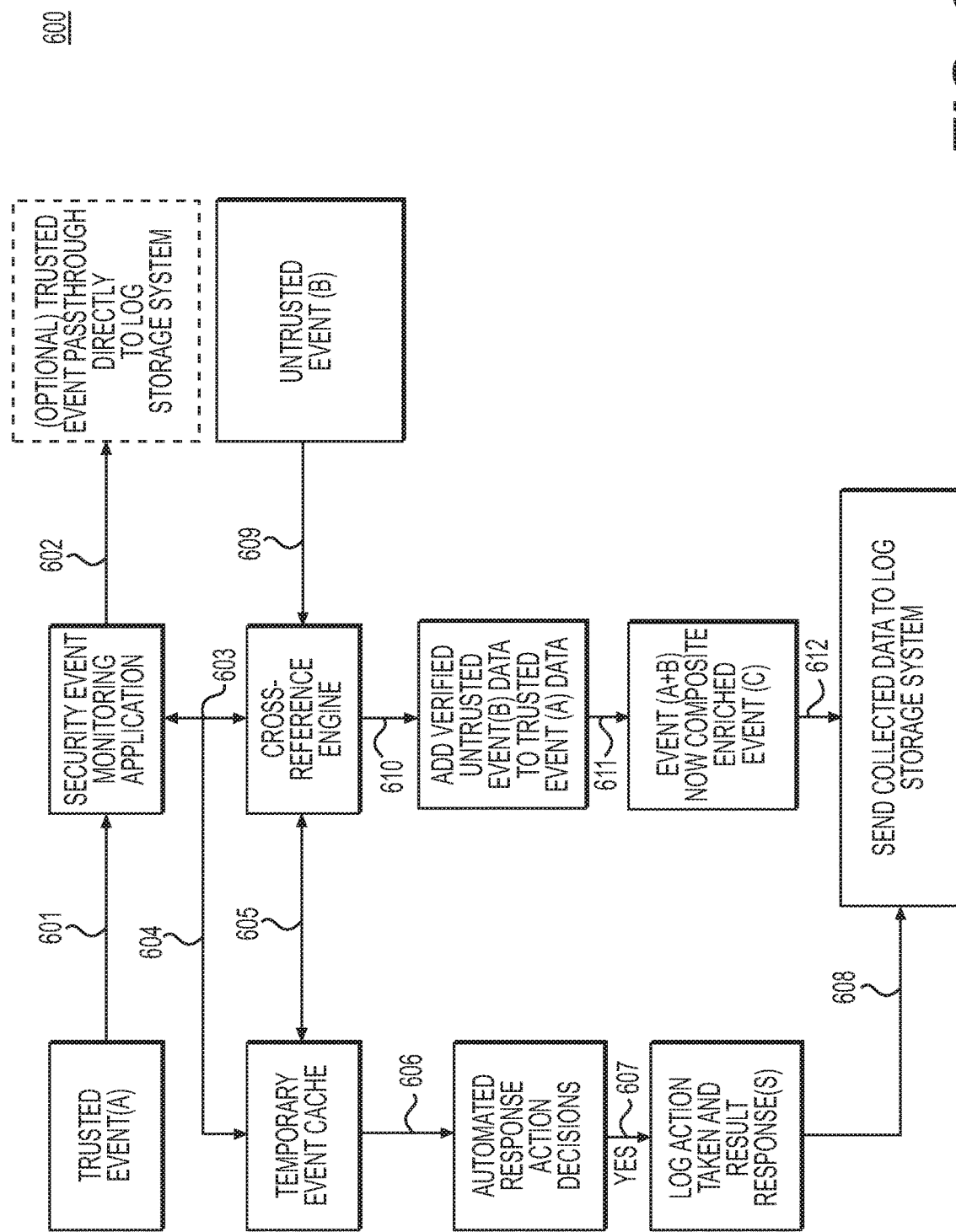
FIG. 6 depicts an exemplary flow diagram of cross reference control, according to one aspect of the present disclosure.

FIG. 6 depicts an exemplary flow diagram 600 of cross reference control, according to one aspect of the present disclosure. As illustrated in FIG. 6 the security event monitoring application may collect information from multiple and disparate sources on the first computing device and cross-reference the information for accuracy. Event data retrieved from the BSM may be considered a true and trusted record of events. In a further embodiment, other sources of event data may also be considered a true and trusted record of events. The attributes of the BSM records may be matched against other sources to cross-reference related events. Sources used for cross-referencing may include BSM records, network interface logs (e.g., traffic, successful connections), firewall logs (e.g., traffic, failed and successful connections), user security and privacy permission changes, application usage information from the first operating system, network interface configuration and attributes data, device location data from the first operating system, file modification events, configuration change events, BSM socket notifications, and first operating system unified logs. Attributes used for cross-referencing may include process id, auditToken, session ID, file or process path, audit user, effective user, BSM socket, unix file descriptors, signing ID, or timestamp. When an untrusted event is detected, the event may be verified against BSM data stored in a database. If the verification is successful, the lower trust event may increase in trust level or may be assigned a higher trust level. A trust score may be given to the incoming untrusted event based on the source of the untrusted event, number of matching attributes to a trusted event, and/or a category of action being reported by the events (such as logins, preference changes, network activity). The trust score and information from the matching BSM events may be added to the untrusted event and may be transmitted to the customer defined destination. In addition to being transmitted to the customer defined destination, BSM events may be temporarily cached in a local database for cross reference purposes. The duration a BSM event is stored in the cached databased may be dependent on the type of event. For example, high importance events may be stored for a longer duration compared to low importance events. Furthermore, the cross reference data from multiple trust levels may then be combined to create one enriched record for the event or action that occurred. The enriched record may be an untrusted event that has been verified against and combined with trusted BSM data. Trusted data from BSM may be appended to the untrusted event to add additional context and consistent data fields for later analysis at the customer defined destination.

The cross referencing control process may be described herein with respect to FIG. 6. The flow diagram 600 may begin at step 601, where data related to a trusted event (A) may be inputted to the security event monitoring application. The data related to trusted event (A) may be collected from the BSM, or it may be collected from another trusted source. If there is no untrusted event data to cross reference, then the trusted event (A) data may be transmitted directly to a log storage system, such as the storage device 120, at step 602. If there is untrusted event data for cross referencing, then the security event monitoring application may pass the trusted event (A) data to a cross-reference engine at step 603. The security event monitoring application or the cross reference engine may also pass the trusted event (A) data to a temporary event cache at step 604 and step 605, respectively, where the trusted event (A) data may be stored. At step 606, a determination may be made to determination if there are automated response action decisions. Automated response actions may include changing of security-relevant preferences or services on a system to raise or lower the defensive posture of a protected system. These preferences or services may change the system's behavior to deny local or external input that may put the computing devices and/or company data at potential for risk. If the outcome of the determination is positive, then at step 607, the action taken and result response(s) may be logged and transmitted to the log storage system at step 608. The log storage system may be the storage device 120.

Upon acquiring data related to an untrusted event (B), the untrusted event (B) data may be transmitted to the cross-reference engine at step 609. The cross-reference engine having both trusted event (A) data and untrusted event (B) data may add verified untrusted event (B) data to trusted event (A) data at step 610. At step 611, the summation of untrusted event (B) data and trusted event (A) data may be transformed into composite enriched event (C) data and at step 612, the composite enriched event (C) data may be transmitted to the log storage system (e.g., storage device 120)

Figure 7:
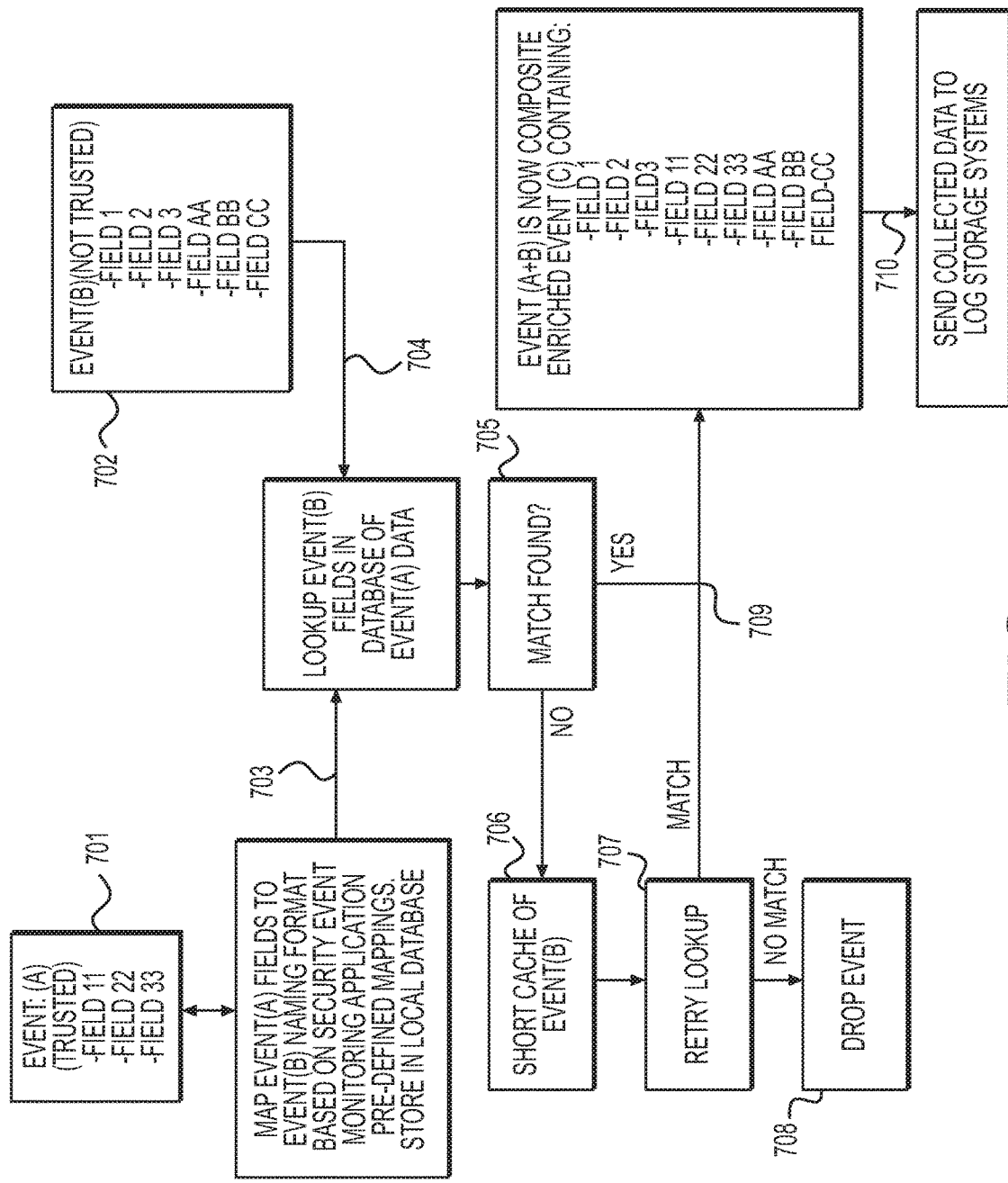
FIG. 7 depicts an exemplary flow diagram of detailed cross reference engine process, according to one aspect of the present disclosure.

FIG. 7 depicts an exemplary flow diagram 700 of a detailed cross reference engine process, according to one aspect of the present disclosure. The flow diagram 700 may begin at step 701, where trusted event (A) data may be collected. Trusted event (A) data may be collected from a trusted logging system and may contain exemplary information such as "Field 11", "Field 22", and "Field 33". At step 702, untrusted event (B) data may be collected. Untrusted event (B) data may be collected from an untrusted logging system and may include information that trust event (A) data does not have. For example, the untrusted event (B) data may contain exemplary information such as "Field 1", "Field 2", "Field 3", "Field AA", "Field BB", and "Field CC". Event (A) data and event (B) data may be the result of different logging systems reporting the same action that occurred. At step 703, event (A) data fields may be mapped to event (B) naming formats based on pre-defined mappings of the security event monitoring application, and may be stored in a local database (e.g. storage device 120). At step 704, the data related to the event (B) may be used to look up event (B) fields in the database of event (A) data. At step 705, a determination is made to determine if any event (B) data fields match the data in the database of event (A). If the result of the determination is negative, then at step 706, the event (B) data may be stored in a temporary cache for a short duration of time, where the duration of time may be related to the type or category of the event (B). At step 707, the look up process of event (B) fields in the database of event (A) data may be retried, and if no match is found, then at step 708, the event (B) data may be dropped from memory or storage device. If, at step 705 or step 707, a match is found as the result of the lookup process, then at step 709, the trusted event (A) data and untrusted event (B) data may be transformed into composite enriched event (C) data. The composite enriched event (C) data may contain exemplary information such as "Field 1", "Field 2", "Field 3", "Field 11", "Field 22", "Field 33", "Field AA", "Field BB", and "Field CC". The field data may indicate how an action was performed on the system, and/or by which party (person and process). For example, field data may include process id, auditToken, sessioniD, file or process path, audit user, effective user, BSM socket, unix file descriptors, signingiD, timestamp, and other relevant data. At step 710, the composite enriched event (C) data may be transmitted to the log storage system (e.g., storage device 120).

Figure 8:
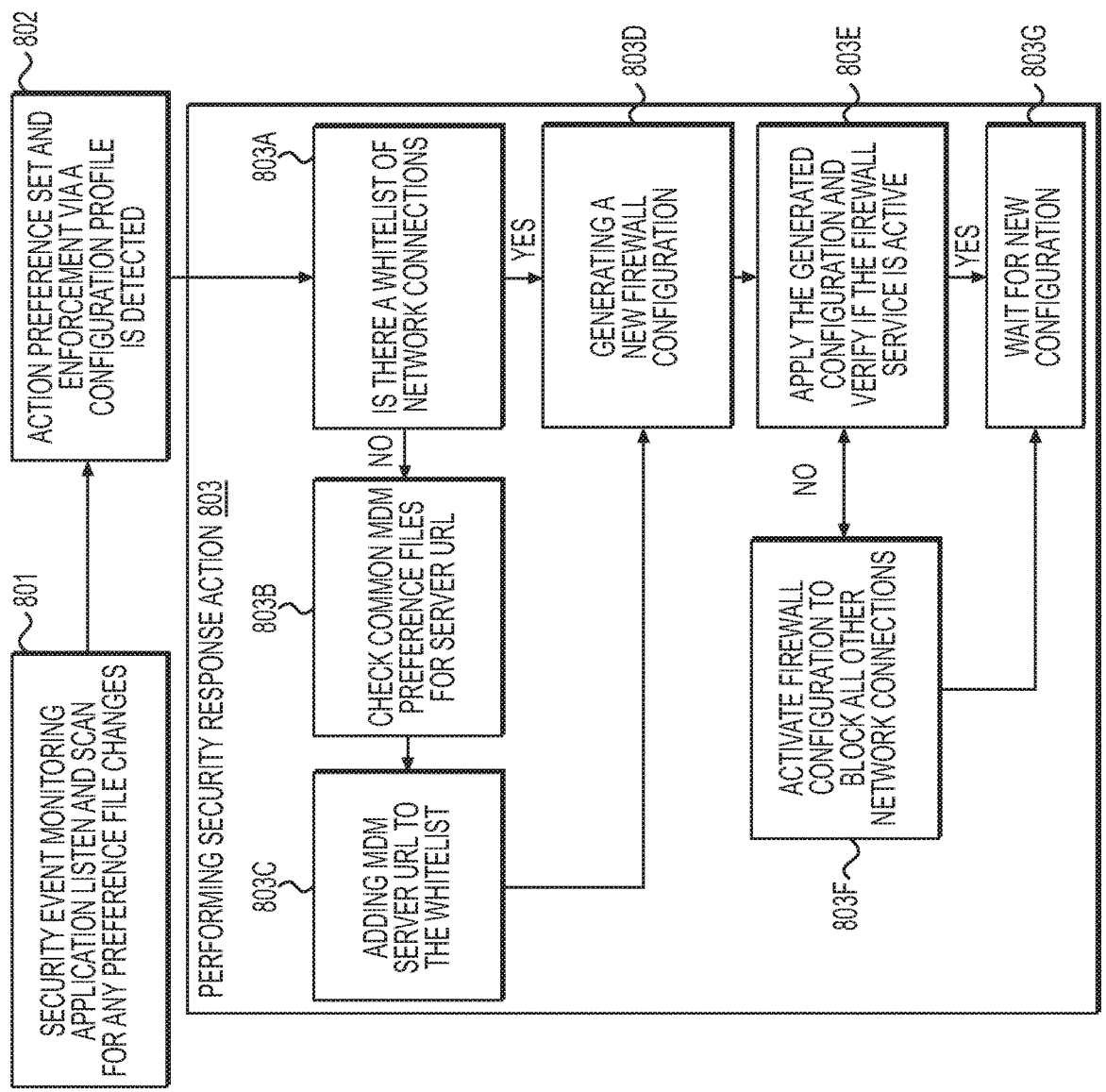
FIG. 8 depicts an exemplary flow diagram of a security event monitoring tool configuration update, according to one aspect of the present disclosure.

FIG. 8 depicts diagram method 800 of a security event monitoring tool response to a configuration update, according to one aspect of the present disclosure. The method 800 may begin at step 801, where the security event monitoring application daemon may listen and periodically scan for any preference file changes. If an action preference is set, and enforcement via a configuration profile of the first operating system is detected in step 802, then the security event monitoring application may perform a security response action assigned to a new preference key and value pair at step 803. If no preference file changes are detected, then the process ends.

In one embodiment illustrated in FIG. 8, the new preference may be to disable all network connections on the first computing device as the result of the configuration update being pushed to the first computing device. The security event monitoring application at step 803*a* may determine if any whitelisted network connections are defined. If the determination is negative, then at step 803*b* the common mobile device management (MDM) preference files may be checked for allowed server URLs. If allowed server URLs are found, the MDM server URLs may be added to the whitelist of network connections at step 803*c*. At step 803*d*, a new firewall configuration may be generated with the whitelist of allowed network connections, application marker rule, and IP (Internet Protocol) space. At step 803*e* the security event monitoring application may apply the generated configuration and verify if the firewall service is active, and if the firewall service is not active, then the new firewall configuration may be activated at step 803*f* to block all network connections other than the whitelisted network connections. If the firewall configuration is active, then the security event monitoring application at step 803*g* may maintain the configuration until a new configuration is created.

Figure 9:
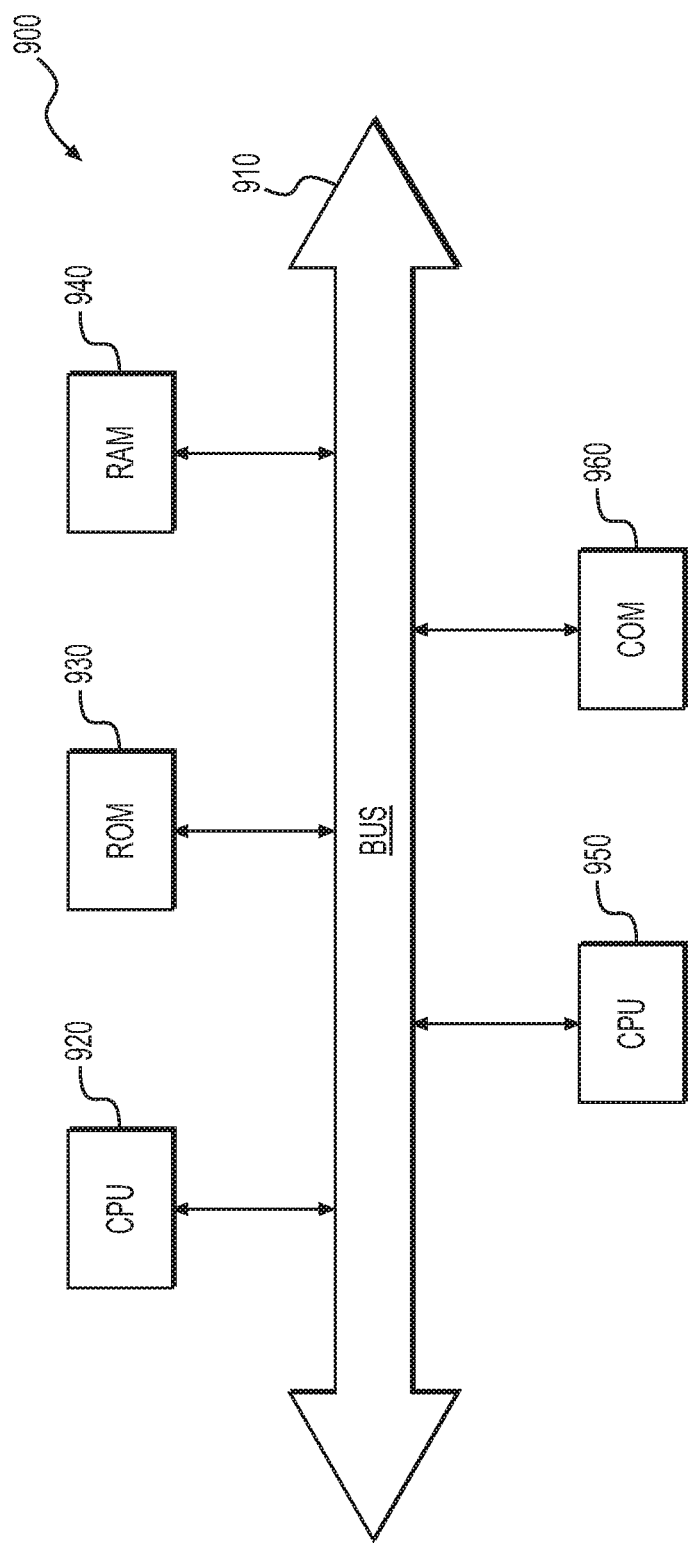
FIG. 9 depicts an exemplary computer device or system, in which embodiments of the present disclosure, or portions thereof, may be implemented.

FIG. 9 depicts a high-level functional block diagram of an exemplary computer device or system, in which embodiments of the present disclosure, or portions thereof, may be implemented, e.g., as computer-readable code. Additionally, each of the exemplary computer servers, databases, user interfaces, modules, and methods described above with respect to FIGS. 1-8 can be implemented in device 900 using hardware, software, firmware, tangible computer readable media having instructions stored thereon, or a combination thereof and may be implemented in one or more computer systems or other processing systems. Hardware, software, or any combination of such may implement each of the exemplary systems, user interfaces, and methods described above with respect to FIGS. 1-8.

If programmable logic is used, such logic may be executed on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor or a plurality of processors, or combinations thereof. Processor devices may have one or more processor "cores."

Various embodiments of the present disclosure, as described above in the examples of FIGS. 1-8, may be implemented using device 900. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 9, device 900 may include a central processing unit (CPU) 920. CPU 920 may be any type of processor device including, for example, any type of special purpose or a general-purpose microprocessor device. As will be appreciated by persons skilled in the relevant art, CPU 920 also may be a single processor in a multi-core/multi-processor system, such system operating alone, or in a cluster of computing devices operating in a cluster or server farm. CPU 920 may be connected to a data communication infrastructure 910, for example, a bus, message queue, network, or multi-core message-passing scheme.

Device 900 also may include a main memory 940, for example, random access memory (RAM), and also may include a secondary memory 930. Secondary memory 930, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 930 may include other similar means for allowing computer programs or other instructions to be loaded into device 900. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 900.

Device 900 also may include a communications interface ("COM") 960. Communications interface 960 allows software and data to be transferred between device 900 and external devices. Communications interface 960 may include a modem, a network interface (such as an Ethernet card), a communications port, a PCMCIA slot and card, or the like. Software and data transferred via communications interface 960 may be in the form of signals, which may be electronic, electromagnetic, optical, or other signals capable of being received by communications interface 960. These signals may be provided to communications interface 960 via a communications path of device 900, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 900 also may include input and output ports 950 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Further Description

Consistent with the above-referenced embodiments, in accordance with the present disclosure, a system or method may collect security event logs from computers running first operating systems and store them in a common structured format (e.g., JSON, csv, xml, etc.) on one or more hard drives for easy collection and analysis by security monitoring tools. Such a system or method may be implemented to perform these steps without introducing security or stability issues to the computer running a first operating system.

In some implementations, examples of advantages provided by the presently described system may include: (1) Interfacing with native macOS (first operating systems) sub-systems (e.g., OpenBSM) to collect activity and information about what a macOS computer is doing and how it is operating; (2) leveraging higher-permission code (kexts) in the first operating systems to collect forensically-sound information without requiring these higher-permissions via API access provided by the first operating systems to declare the audit_classes desired for collection; (3) collecting and translating binary OpenBSM events with unknown length, token (line) types, and content within the token lines; (4) filtering the events from the audit_classes based on the audit_event type that is defined in the header token of each OpenBSM event and drops audit_event types that are not defined in the active collection level; (5) normalizing the collected data for Windows-based (based on the second operating systems) log collection or security tools naming conventions (e.g., mac login event to windows login event); (6) formatting the collected data for native ingestion into security operations tools that companies already use; (7) storing these renamed and formatted events in a JSON log file on the audited system for collection by security operations tools; (8) streaming the finished output data directly to security monitoring servers hosted and managed by a customer; and/or (9) performing actions in response to Apple™ configuration profiles setting specific preference files with specific key=value pairs (e.g., turning off all network in response to a preference file being set and via configuration profile on the fly.

JSON is a human-readable format that breaks data out into (key=value) fields. JSON is an open web standard for data transmission and is parsable by nearly all log collection and security tools. Configuration profiles are a device management payload that is specific to the first operating systems.

A system or method in accordance with the present disclosure may not require a vendor kernel extension. In one or more embodiments, the system or method may leverage the OpenBSM kernel extension that ships with first operating systems.

The first operating systems may continue to allow 3rd party kexts in future versions of the operating systems.

In one or more embodiments, the system or method may define the audit_classes and collection parameters that are collected on macOS'/dev/auditpipe.

In one or more embodiments, the system or method may filter binary coded events collected from/dev/auditpipe and store only the audit_events that are pre-defined for collection.

Embodiments of the present disclosure may include event normalization to Windows tools (second operating systems). For example, rather than AUE_user_login (e.g., an event naming convention for first operating systems), log headers may be renamed so existing, second operating system tools may recognize first operating system login events in the same manner (or sufficiently similar manner) as second operating system login events.

To enhance accuracy, these normalizations may, for example, involve manual inputs, Methods and systems of the present disclosure may include code portability within the first operating systems.

The systems and methods in accordance with the present disclosure may run on macOS from, e.g., 2012, up to the latest beta with no modification. This capability and portability may be achieved because the kernel code of the first operating systems (macOS) is utilized, and the presently disclosed implementations may run only in the normal system context. This may be contrasted, for example, with prior security tools which run their own kext module. Furthermore, the presently disclosed implementations may run on older systems (pre-2012) as well. Tools that leverage kexts may have to run on specific versions of macOS (the first operating systems) for the specific version of the security application in order to keep the system running normally.

Embodiments of the present disclosure may meet exacting specifications of the first operating systems for how modern security applications should run and be configured on the first operating systems. For example, in the following list of context levels from lowest permission to highest permission, the presently disclosed systems and methods may run on system-context Daemons: (1) user-specific actions; (2) user-specific Daemons; (3) all-user Daemons; (4) system-context Daemons; (5) System Daemons for first operating systems only; and (6) Kernel Context.

Application preferences may be configured via .plist format files of the first operating systems. These files can be instantly applied and enforced via Apple configuration profiles. Configuration profiles may be critical for configuration management of the first operating systems.

In one or more embodiments, the system and method in accordance with the present disclosure may be designed for real-time streaming of specially curated security event data in common data structures that can be analyzed by many different tools.

In one or more embodiments, the present disclosure may be designed to be as low-impact on the computer's resources (CPU, memory, etc.) and user experience as possible. This focus on user experience and monitoring rather than blocking process execution may be unique in the security space of the first operating systems.

One or more embodiments may permit one or more abilities to respond to the first operating systems' configuration profile mobile device management (MDM) enforcements of preference file enforcements. These preferences and actions may be all created in one or more codes associated with the presently disclosed system or method, rather than functions provided by the operating system or an MDM provider.

For example, a configuration profile with preference setting "shouldKillNetwork?" set to "true" may cause a change in system firewall settings to disable all network traffic on the computer. If a second preference "allowedNetworkLocations" whitelists specific websites, such as the company MDM server and the first operating systems' servers, the computer can be remotely controlled to mitigate the threat.

The presently disclosed system or method may not heavily utilize graphical user interface or visual elements.

In some implementations, presently disclosed the system or method may be an extremely lightweight security tool where other security tools regularly slow down even the newest and fastest macs.

All configurations may use configuration profiles of the first operating system (macOS) so that settings can be enforced remotely.

The presently disclosed system or method may not call home to its own "cloud," but rather, logs are stored locally until collected with enterprise log tools.

In some embodiments, the disclosed systems only collect logs that have security or operational value Collecting all logs from OpenBSM may not be viable. Practically, endpoint resource usage (CPU and Storage) may make the laptops and desktops extremely slow. Financially, storing over 300 MB of logs per computer per day is extremely expensive in licensing, hosted storage costs, and internet bandwidth.

Collecting the wrong audit_classes for the first audit_event filter may be CPU intensive. For example, an observation was made, resulting in 40% or more consistent CPU usage when collecting the wrong audit_classes on /dev/auditpipe.

Embodiments of the present disclosure may help ensure that all relevant security events are captured. Audit_class collections may contain audit_event types and are broken out into categories such as network events, login events, and process executions. All audit_classes and audit_events may be configured by original developers of the operating system on default installations of macOS. The likelihood of success in detecting a negative result failure state may be high. Each action, such as logging into the system, may generate, for example, 3 to 10 different audit_event(s). Each of these, e.g., 3 to 10 audit_events may contain different and important information.

The presently disclosed system or method may define the audit_classes that are desired for collection, from the audit kernel components on the /dev/auditpipe. From those audit_classes, the one or more embodiments disclosed herein may then further filter the data stream and only retain the audit_events from each audit_class that are relevant.

Embodiments of the present disclosure may include Kext-free application design. For example some embodiments may leverage code of the first operating systems for kernel access may provide many stability and security benefits, but also may pose operational challenges like tamper-resistance.

Systems or methods in accordance with the present disclosure can alert on, a malicious application or user with sufficient privileges from removing the tool from a computer system.

In one or more embodiments, the system may be vulnerable solely to users or apps with "admin" privileges and above.

In one or more embodiments, binary and configuration files may be protected from malicious tampering.

In one or more embodiments, these protections may force an attacker to perform multiple actions to remove from a computer device the tool described in the present disclosure, providing enough time to log the tamper event.

Associated files may be protected with "uchg" flag native to the first operating systems. "uchg" may require a second command "nouchg" for any user or app to be able to modify or delete the file. This 2-step configuration change may thwart low skilled attackers and may provide enough time to log advanced attackers. All preferences can be set with configuration profiles which are enforced at the kernel level by the first operating systems. Malicious modification of the preference files on the system would have no effect if configuration profiles are used. In one or more embodiments, applications running in the background may automatically relaunch if the application is quit or "killed." The background process file is protected by the same "uchg" flag as other supporting files.

To format application output, JSON stanzas may be manually populated in some implementations, which map the first operating systems' event naming conventions to second operating systems' security tool naming conventions. Each stanza may be mapped to an OpenBSM audit token format. Each event may have multiple JSON stanzas that are combined at the end to make a JSON object that represents the event. The filtered events may then be parsed into JSON objects. A flow of a single event through parsing engine is described below. For example, a single binary audit_event received by the parsing engine, the binary event is read into parser token by token, event lines are mapped into the corresponding JSON stanza, and JSON stanzas from a single filtered event are combined into a JSON object. The resulting JSON object may have all of the data from the single binary event.

The presently disclosed systems and methods may not take large percentages of available CPU in the background, which would slow down the system.

A large volume of events may be filtered by a first audit_event match filter, and for achieving this capability, the code needed to be highly optimized.

In some embodiments, the disclosed systems or methods do not block threats that they detect. In some cases, in order to block threats, an application may need its own kext in the kernel, which could lead to other problems discussed herein. However, it is contemplated that, if necessary, the disclosed systems and methods could block threats.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention. The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer implemented method for security event monitoring, the method comprising:

receiving, by one or more processors, data from one or more modules of a first operating system, wherein the data from the one or more modules includes data from both trusted sources and untrusted sources;

defining, by the one or more processors, an audit classes data filter for collection by a security event monitoring application, wherein the audit classes data filter includes data only from trusted sources;

receiving, by the one or more processors, a verbosity level of the audit classes data filter;

filtering, by the one or more processors, the data from the trusted sources based on the verbosity level of the audit classes data filter, resulting in a trusted stream of data;

comparing, by the one or more processors, the trusted stream of data with the data from the untrusted sources;

creating a validated data set by comparing field data from the trusted stream of data with the data from the untrusted sources, wherein a first subset of data from the untrusted sources is excluded from the validated data set when the first subset does not include any of the field data from the trusted stream of data;

comparing, by the one or more processors, the validated data set with a set of blacklisted values;

dropping, by the one or more processors, any value from the validated data set that matches one or more blacklisted values from the set of blacklisted values, based on the comparison of the validated data set with the set of blacklisted values, resulting in a new data set;

parsing, by the processor, the new data set into a common structured format; and outputting, by the one or more processors, the new data set that is in the common structured format.

2. The computer implemented method of claim 1, wherein the common structured format is at least one of JSON, csv, or xml.

3. The computer implemented method of claim 1, further including receiving, by the one or more processors, a preference file change for a first computing device executing the first operating system; and performing, by the one or more processors, a response action by the security event monitoring application based on the preference file change.

4. The computer implemented method of claim 1, wherein the field data includes one or more of process id, auditToken, session ID, file or process path, audit user, effective user, unix socket, unix file descriptors, signing ID, or timestamp.

5. The computer implemented method of claim 4, wherein the trusted stream of data includes one or more of BSM records, network interface logs, firewall logs, user security and privacy permission changes, application usage information from the first operating system, network interface configuration and attributes data, device location data from the first operating system, file modification events, configuration change events, unix socket notifications, or first operating system logs.

6. The computer implemented method of claim 5, wherein, upon determining that a second subset of data from the untrusted sources contains field data from the trusted stream of data, increasing a trust level of the second subset.

7. A non-transitory computer-readable medium for security event monitoring, the non-transitory computer-readable medium storing instructions that, when executed by one or more processors, configure the one or more processors to perform:

receiving, by the one or more processors, data from a first operating system, wherein the data from the first operating system includes data from both trusted sources and untrusted sources;

defining, by the one or more processors, an audit classes data filter for collection by a security event monitoring application, wherein the audit classes data filter includes data only from trusted sources;

filtering, by the one or more processors, the data from the trusted sources based on a verbosity level of the audit classes data filter, resulting in a trusted stream of data;

comparing, by the one or more processors, the trusted stream of data with the data from the untrusted sources;

dropping, by the one or more processors, data from certain untrusted sources upon determining that the trusted stream of data does not verify the data from the certain untrusted sources, when there is no field, associated with the data from the certain untrusted sources, that confirms the data from the certain untrusted sources with the trusted stream of data, resulting in a validated data set excluding the data from the certain untrusted sources;

comparing, by the one or more processors, the validated data set with a set of blacklisted values;

dropping, by the one or more processors, any value from the validated data set that matches one or more blacklisted values from the set of blacklisted values, based on the comparison of the validated data set with the set of blacklisted values, resulting in a new data set;

parsing, by the processor, the new data set into a common structured format; and outputting, by the one or more processors, the new data set that is in the common structured format.

8. The non-transitory computer-readable medium of claim 7, wherein the common structured format is at least one of JSON, csv, or xml.

9. The non-transitory computer-readable medium of claim 7, further including receiving, by the one or more processors, the verbosity level of the audit classes data filter, wherein the verbosity level defines an amount of audit classes data collected.

10. The non-transitory computer-readable medium of claim 9, further including receiving, by the one or more processors, a preference file change for a first computing device executing the first operating system; and performing, by the one or more processors, a response action by the security event monitoring application based on the preference file change.

11. The non-transitory computer-readable medium of claim 7, wherein the field, associated with the data from the certain untrusted sources, that confirms the data from the certain untrusted sources with the trusted stream of data, includes one or more of process id, auditToken, session ID, file or process path, audit user, effective user, unix socket, unix file descriptors, signing ID, or timestamp.

12. The non-transitory computer-readable medium of claim 11, wherein the trusted stream of data includes one or more of BSM records, network interface logs, firewall logs, user security and privacy permission changes, application usage information from the first operating system, network interface configuration and attributes data, device location data from the first operating system, file modification events, configuration change events, unix socket notifications, or first operating system logs.

13. The non-transitory computer-readable medium of claim 12, wherein, upon determining that the trusted stream of data does verify certain data from the certain untrusted sources, when there is a field, associated with the data from the certain untrusted sources, that confirms the data from the certain untrusted sources with the trusted stream of data, increasing a trust level of the verified certain data.

14. A computer implemented method for security event monitoring, the method comprising:
  receiving, by one or more processors, data from a first operating system, wherein the data from the first operating system includes data from both trusted sources and untrusted sources;
  filtering, by the one or more processors, the data from the trusted sources based on a verbosity level of an audit classes data filter, resulting in a trusted stream of data;
  comparing, by the one or more processors the trusted stream of data with the data from the untrusted sources;
  dropping, by the one or more processors, data from certain untrusted sources upon determining that the trusted stream of data does not verify the data from the certain untrusted sources, when there is no field, associated with the data from the certain untrusted sources, that confirms the data from the certain untrusted sources with the trusted stream of data, resulting in a validated data set excluding the data from the certain untrusted sources;
  parsing, by the processor, the validated data set into a common structured format; and
  outputting, by the one or more processors, the validated data set that is in the common structured format.

15. The computer implemented method of claim 14, wherein the common structured format is at least one of JSON, csv, or xml.

16. The computer implemented method of claim 14, wherein the field, associated with the data from the certain untrusted sources, that confirms the data from the certain untrusted sources with the trusted stream of data, includes one or more of process id, auditToken, session ID, file or process path, audit user, effective user, unix socket, unix file descriptors, signing ID, or timestamp.

* * * * *